(12) United States Patent
Li

(10) Patent No.: US 12,113,596 B2
(45) Date of Patent: *Oct. 8, 2024

(54) BEAM TRACKING METHOD FOR MMWAVE COMMUNICATION AND ELECTRONIC DEVICE, ELECTRONIC DEVICE AND COMPUTER READABLE STORAGE MEDIUM

(71) Applicant: Nanning FuLian FuGui Precision Industrial Co., Ltd., Nanning (CN)

(72) Inventor: Yu-Sheng Li, New Taipei (TW)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/378,845

(22) Filed: Oct. 11, 2023

(65) Prior Publication Data

US 2024/0039595 A1 Feb. 1, 2024

Related U.S. Application Data

(63) Continuation of application No. 17/839,450, filed on Jun. 13, 2022, now Pat. No. 11,870,522.

(51) Int. Cl.
*H04B 7/06* (2006.01)

(52) U.S. Cl.
CPC ................. *H04B 7/0617* (2013.01)

(58) Field of Classification Search
CPC .................................................... H04B 7/0617
USPC ........................................................... 375/267
See application file for complete search history.

(56) References Cited

U.S. PATENT DOCUMENTS

| 11,870,522 B2 * | 1/2024 | Li ................. H04B 7/0617 |
| 2012/0243638 A1 * | 9/2012 | Maltsev ............. H04L 27/2656 |
| | | 375/316 |
| 2014/0148107 A1 | 5/2014 | Maltsev |
| 2016/0020876 A1 | 1/2016 | Raghavan et al. |
| 2019/0246394 A1 | 8/2019 | Asplund et al. |
| 2020/0304198 A1 | 9/2020 | Orhan et al. |
| 2021/0028850 A1 | 1/2021 | Elliott et al. |

* cited by examiner

*Primary Examiner* — Fitwi Y Hailegiorgis
(74) *Attorney, Agent, or Firm* — ScienBiziP, P.C.

(57) ABSTRACT

An electronic device, which comprises a memory, a processor, and a serial number length adjustment program stored in the memory and operable on the processor is disclosed. The serial number length adjustment program is executed by the processor to implement following functions: performing an angle estimation algorithm on all user equipments (UEs) through a low-frequency band to estimate beam angles of the UEs relative to the electronic device; generating high-frequency band beams of the UEs relative to the electronic device according to the estimated beam angles; and enabling the electronic device to communicate with the UEs according to the generated high-frequency band beams.

3 Claims, 5 Drawing Sheets

BEAM TRACKING METHOD FOR MMWAVE COMMUNICATION AND ELECTRONIC DEVICE, ELECTRONIC DEVICE AND COMPUTER READABLE STORAGE MEDIUM

FIELD

The disclosure relates to network communications, and more particularly to a beam tracking method for millimeter wave (mmWave) communication and electronic device using the method.

BACKGROUND

With the popularization of various multimedia applications on mobile platforms, users' demands for communication bandwidth are also increasing that uses mmWave frequency bands to increase bandwidth is the most direct and effective way to improve transmission efficiency and data capacity. Although high-frequency millimeter waves can provide a large available bandwidth, the propagation and penetration losses encountered by radio waves in their frequency bands are also very high, and there will be serious energy loss. Therefore, it is necessary to design a beamforming technique by an antenna array to improve the antenna gain to realize long-distance communication.

However, because the beams formed by the antenna array are directional, when the mobile communication terminals move, the beams will be misaligned with each other and there will be significant signal drop.

However, since beams formed by an antenna array are directional, when mobile communication terminals move, the beams thereof may be misaligned with each other to result in significant signal drop. How to make the mmWave beams can be adjusted with the user's movement in order to maintain good communication quality needs to be achieved through different beam tracking algorithms.

To implement an angle estimation algorithm for beam tracking on mmWave, there must be a large number of RF signal chains in an antenna module to connect each antenna in an antenna array. The signal chain may also include data converters, filters, power amplifiers and other components, which in turn lead to a significant increase in the size, heat and cost of mmWave radio frequency.

Based on the above considerations, most commercial transfer systems first set up multiple sets of fixed-angle beams, and beam scanning and beam tracking are performed via rapidly switching beam sets during communication. However, without implementing the angle estimation algorithm, the communication between a base station and a mobile terminal may cause the problem of beam misalignment, and, especially if the beam precision of the base station is higher, this situation is more obvious.

BRIEF DESCRIPTION OF THE DRAWINGS

Many aspects of the present disclosure can be better understood with reference to the following figures. The components in the figures are not necessarily drawn to scale, the emphasis instead being placed upon clearly illustrating the principles of the present disclosure. Moreover, in the drawings, like reference numerals designate corresponding parts throughout the several views. Implementations of the present technology will now be described, by way of embodiments, with reference to the attached figures, wherein.

DETAILED DESCRIPTION

Figure 1:
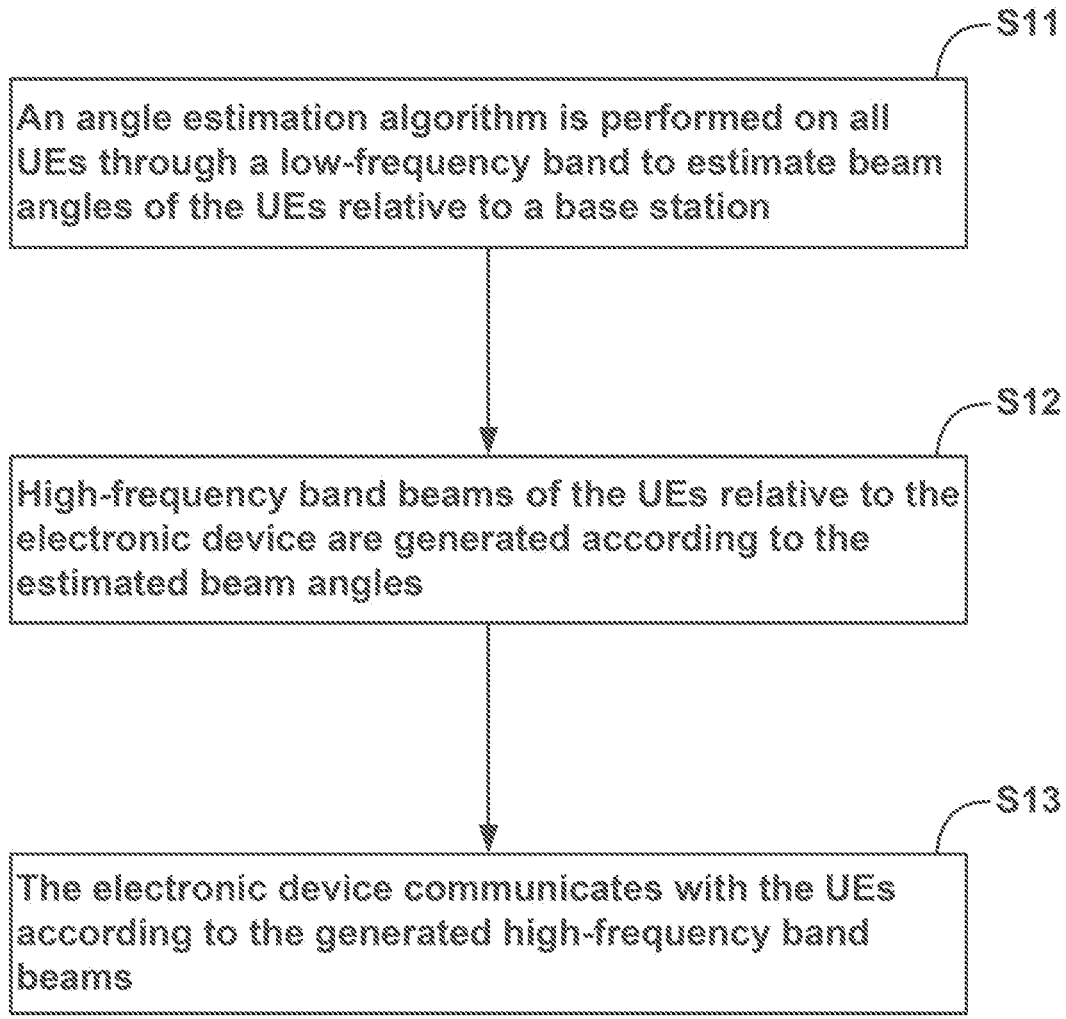
FIG. 1 is a flowchart of a first embodiment of a beam tracking method for mmWave communication method of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "comprising," when utilized, means "including, but not necessarily limited to"; it specifically indicates open-ended inclusion or membership in the so-described combination, group, series, and the like.

Physical property of a millimeter wave (mmWave) frequency band is very different from that of a general sub-6 GHz frequency band. Previous studies have figured out that channel correlation parameters of the mmWave band can be derived from channel coefficients of the sub-6 GHz band when spatial correlations of the two band are consistent. In other words, a common angle estimation algorithm, such as angle of arrival (AOA), can be implemented in the sub-6 GHz band, and the estimated angles can be provided to the high-frequency (mmWave) system as reference information to adjust angles of mmWave beams to obtain more accurate directions of the mobile devices.

FIG. 1 is a flowchart of a first embodiment of a beam tracking method for mmWave communication method of the present disclosure. According to different needs, the order of the steps in the flowchart can be changed, and some steps can be omitted.

In step S11, an angle estimation algorithm is performed on all user equipments (UEs) through a low-frequency band (e.g., sub-6 GHz) to estimate beam angles of the UEs relative to a base station.

In step S12, high-frequency band beams of the UEs relative to the base station are generated according to the estimated beam angles.

In an embodiment of the present disclosure, each packet transmitted, from a UE, to the base station comprises a user-defined field storing a parameter, Active_BeamTracking. As Active_BeamTracking=1, the base station performs beam tracking on the UE.

In step S13, the base station communicates with the UEs according to the generated mmWave beam.

It is noted that the steps S11 to S13 refer to an initialization stage of the UE.

Figure 2:
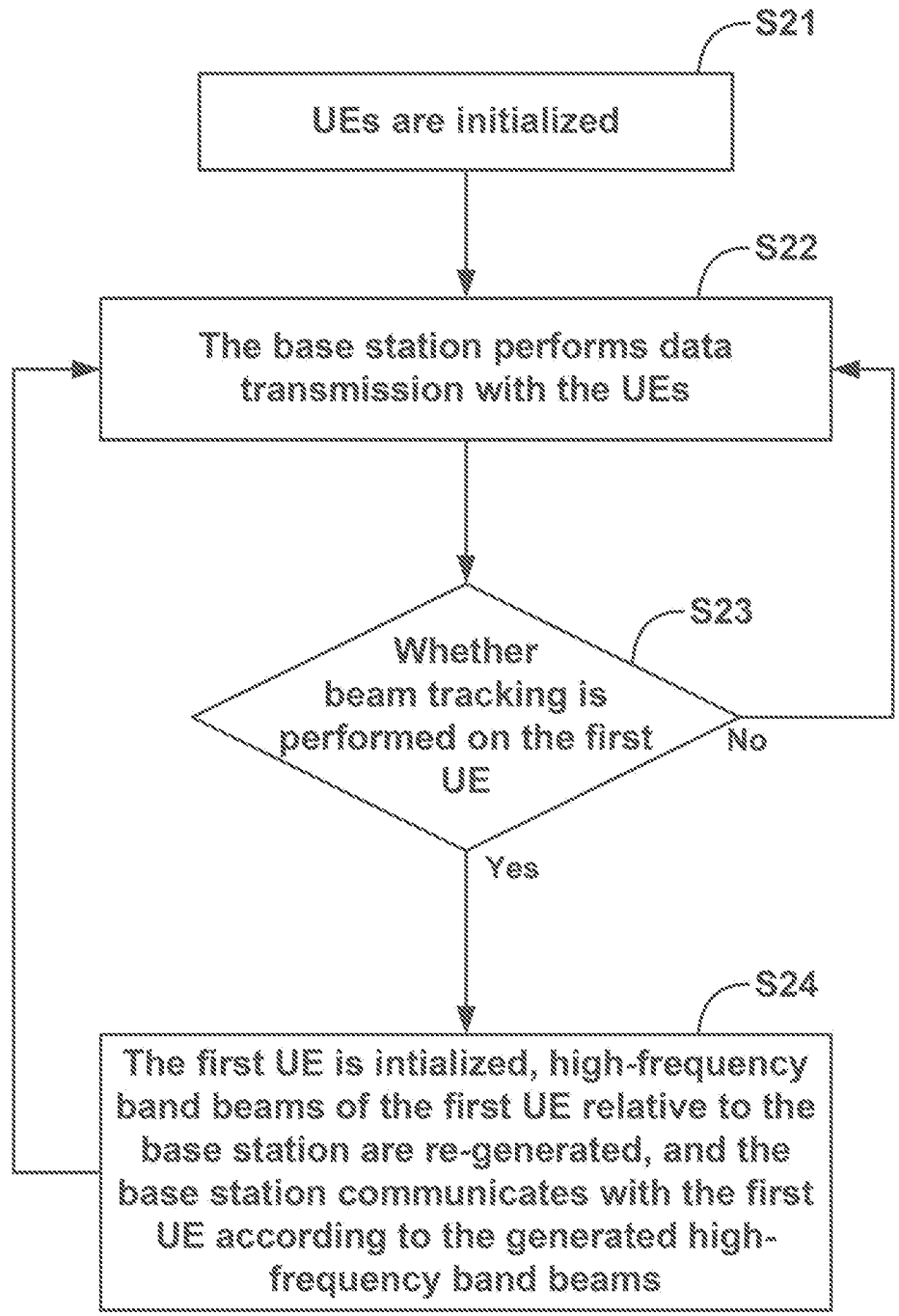
FIG. 2 is a flowchart of a second embodiment of a beam tracking method for mmWave communication method of the present disclosure.

FIG. 2 is a flowchart of a second embodiment of a beam tracking method for mmWave communication method of the present disclosure. According to different needs, the order of the steps in the flowchart can be changed, and some steps can be omitted.

In step S21, steps S11 to S13 are performed on the base station and all UEs within the signal range of the base station, so as to enable the base station to communicate with the UEs according to the generated mmWave beam.

In step S22, the base station performs data transmission with the UEs.

In step S23, when one of the UEs, for example, a first UE, moves, it is determined whether the beam tracking is performed on the first UE. If the beam tracking is not performed on the first UE, the process proceeds to step S22 and the base station continuously performs data transmission with the first UE.

In an embodiment of the present disclosure, each packet transmitted, from the first UE, to the base station comprises a user-defined field storing a parameter, Active_BeamTracking. As Active_BeamTracking=1, the base station performs beam tracking on the first UE.

In step S24, if the beam tracking is performed on the first UE, Active_BeamTracking=1 at present, steps S11 to S13 are performed on the first UE, so as to enable the base station to communicate with the first UE according to the generated mmWave beam.

Figure 3:
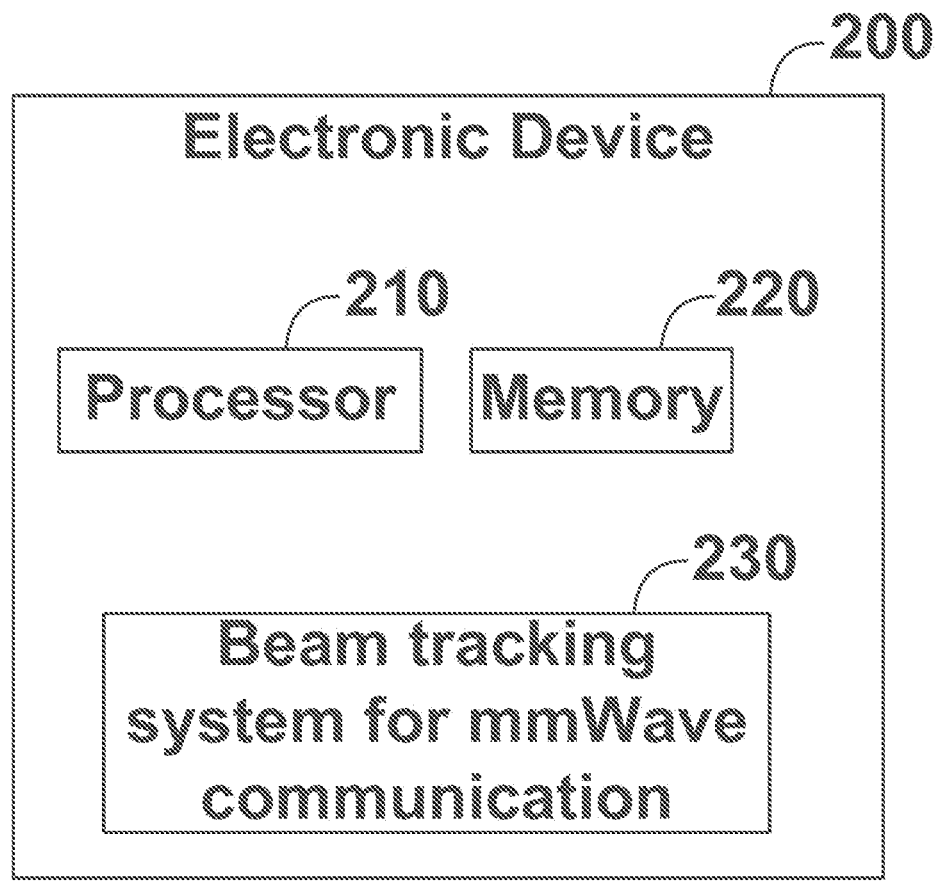
FIG. 3 is a block diagram of an embodiment of the hardware architecture of an electronic device using the method of the present disclosure.

FIG. 3 is a block diagram of an embodiment of the hardware architecture of an electronic device using the beam tracking method for mmWave communication method of the present disclosure. The electronic device 200 may be, but is not limited to, connected to a processor 210, a memory 220, and a beam tracking system for mmWave communication 230 via system buses. The electronic device 200 shown in FIG. 6 may include more or fewer components than those illustrated, or may combine certain components.

The memory 220 stores a computer program, such as the beam tracking method for mmWave communication system 230, which is executable by the processor 210. When the processor 210 executes the beam tracking method for mmWave communication system 230, the blocks in one embodiment of the booting mode configuration method applied in the electronic device 200 are implemented, such as blocks S11 to S13 shown in FIGS. 1 and S21 to S24 shown in FIG. 2.

It will be understood by those skilled in the art that FIG. 3 is merely an example of the electronic device 200 and does not constitute a limitation to the electronic device 200. The electronic device 200 may include more or fewer components than those illustrated, or may combine certain components. The electronic device 200 may also include input and output devices, network access devices, buses, and the like.

The processor 210 may be a central processing unit (CPU), or other general-purpose processors, a digital signal processor (DSP), an application specific integrated circuit (ASIC), a Field-Programmable Gate Array (FPGA), or another programmable logic device, discrete gate or transistor logic device, discrete hardware components, or the like. The processor 210 may be a microprocessor or other processor known in the art.

The memory 220 can be used to store the beam tracking method for mmWave communication system 230 and/or modules/units by running or executing computer programs and/or modules/units stored in the memory 220. The memory 220 may include a storage program area and a storage data area. In addition, the memory 220 may include a high-speed random access memory, a non-volatile memory such as a hard disk, a plug-in hard disk, a smart memory card (SMC), and a secure digital (SD) card, flash card, at least one disk storage device, flash device, or another volatile solid state storage device.

The beam tracking method for mmWave communication system 230 can be partitioned into one or more modules/units that are stored in the memory 220 and executed by the processor 210. The one or more modules/units may be a series of computer program instructions capable of performing particular functions of the beam tracking method for mmWave communication system 230.

Figure 4:
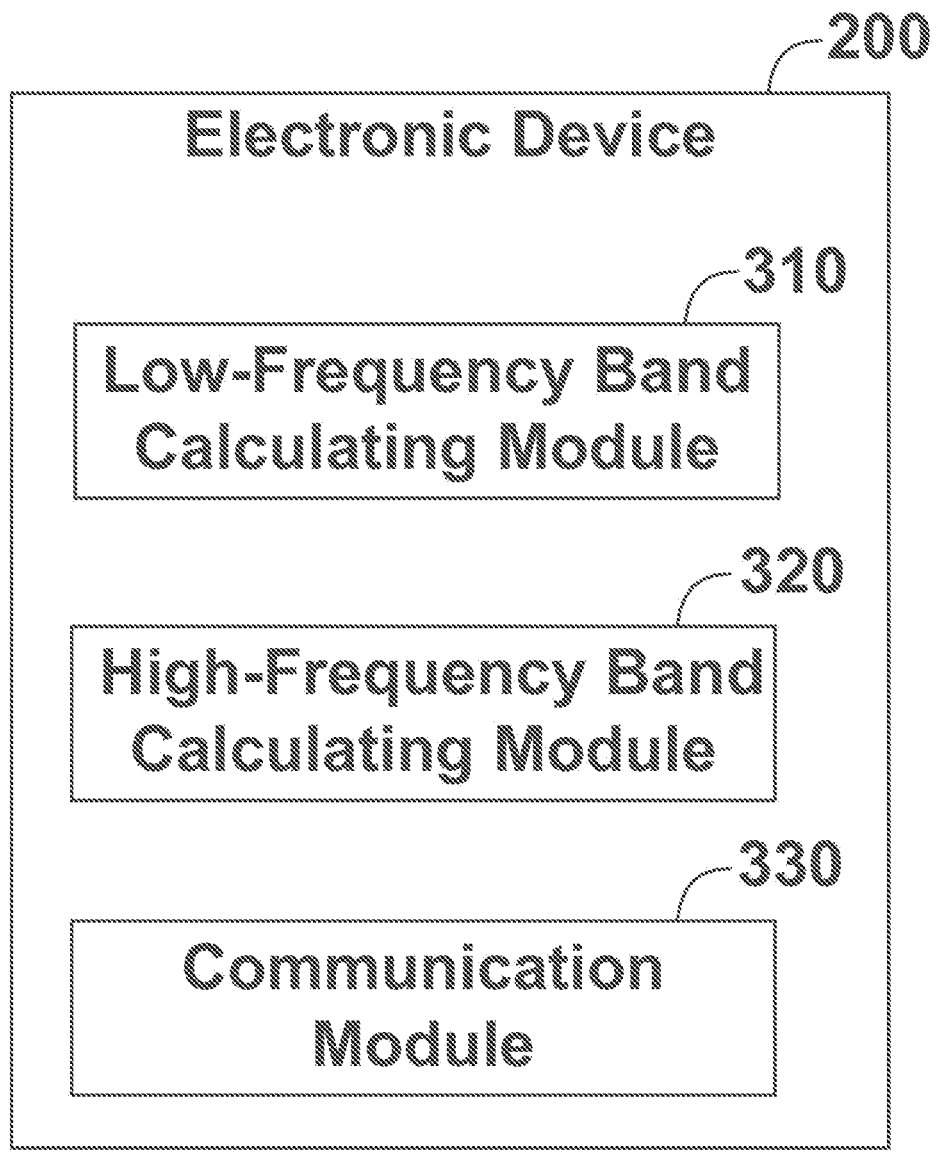
FIG. 4 is a block diagram of a first embodiment of functional blocks of an intellectual audit scheduling module of the present disclosure.

FIG. 4 is a schematic diagram of a first embodiment of functional blocks of the electronic device using the method of the present disclosure.

The electronic device 200 comprises a low-frequency band calculating module 310, a high-frequency band calculating module 320 and a communication module 330.

The low-frequency band calculating module 310 performs an angle estimation algorithm on all user equipments (UEs) through a low-frequency band (e.g., sub-6 GHz) to estimate beam angles of the UEs relative to a base station.

The high-frequency band calculating module 320 generates high-frequency band (mmWhave) beams of the UEs relative to the base station according to the estimated beam angles.

In an embodiment of the present disclosure, each packet transmitted, from a UE, to the base station comprises a user-defined field storing a parameter, Active_BeamTracking. As Active_BeamTracking=1, the base station performs beam tracking on the UE.

The communication module 330 communicates with the UEs according to the generated mmWave beam.

Figure 5:
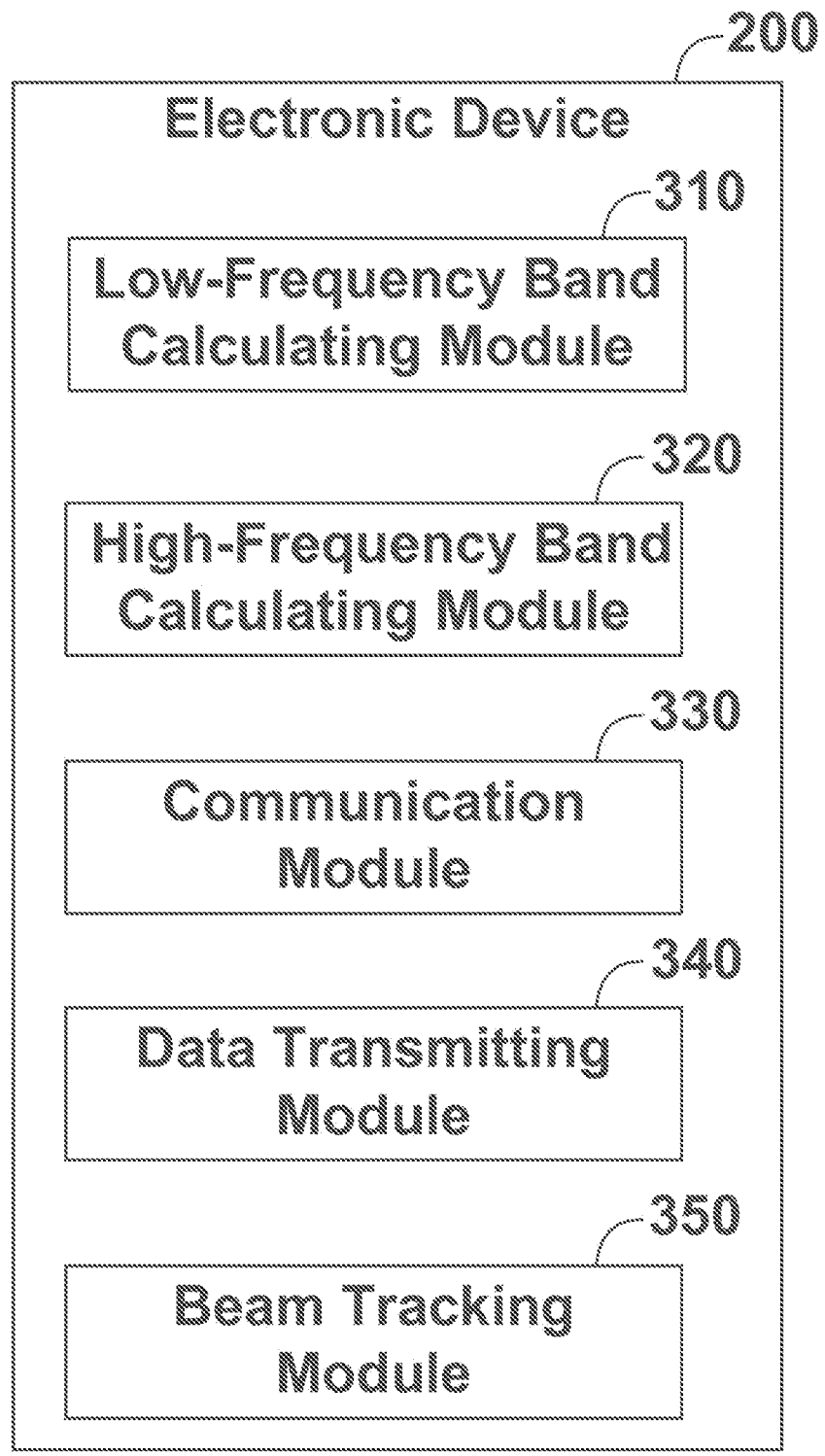
FIG. 5 is a block diagram of a second embodiment of functional blocks of an intellectual audit scheduling module of the present disclosure.

FIG. 5 is a schematic diagram of a second embodiment of functional blocks of the electronic device using the method of the present disclosure.

The electronic device 200 comprises a low-frequency band calculating module 310, a high-frequency band calculating module 320, a communication module 330, a data transmitting module 340 and a beam tracking module 350.

The low-frequency band calculating module 310 performs an angle estimation algorithm on all user equipments (UEs) through a low-frequency band (e.g., sub-6 GHz) to estimate beam angles of the UEs relative to a base station.

The high-frequency band calculating module 320 generates high-frequency band (mmWhave) beams of the UEs relative to the base station according to the estimated beam angles.

In an embodiment of the present disclosure, each packet transmitted, from a UE, to the base station comprises a user-defined field storing a parameter, Active_BeamTracking. As Active_BeamTracking=1, the base station performs beam tracking on the UE.

The communication module 330 communicates with the UEs according to the generated mmWave beam.

The data transmitting module 340 performs data transmission with the UEs.

When one of the UEs, for example, a first UE, moves, the beam tracking module 350 determines whether the beam tracking is performed on the first UE. If the beam tracking is not performed on the first UE, the data transmitting module 340 continuously performs data transmission with the first UE.

In an embodiment of the present disclosure, each packet transmitted, from the first UE, to the base station comprises a user-defined field storing a parameter, Active_BeamTracking. As Active_BeamTracking=1, the base station performs beam tracking on the first UE.

If the beam tracking is performed on the first UE, Active_BeamTracking=1 at present, the low-frequency band calculating module 310, the high-frequency band calculating module 320 and the communication module 330 performs the afore-mentioned steps on the first UE, so as to enable the beam tracking module 350 to communicate with the first UE according to the generated mmWave beam.

It is to be understood, however, that even though numerous characteristics and advantages of the present disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An electronic device, which comprises a memory, a processor, and a serial number length adjustment program stored in the memory and operable on the processor, wherein the serial number length adjustment program is executed by the processor to implement following steps:
   performing an angle estimation algorithm on all user equipments (UEs) through a low-frequency band to estimate beam angles of the UEs relative to the electronic device;
   generating high-frequency band beams of the UEs relative to the electronic device according to the estimated beam angles; and
   enabling the electronic device to communicate with the UEs according to the generated high-frequency band beams.

2. The electronic device of claim 1, wherein the processor further implements the following steps:
   enabling a base station to perform a data transmission with the UEs;
   determining, when a first UE of the UEs moves, whether a beam tracking is performed on the first UE;
   re-generating, if the beam tracking is performed on the first UE, high-frequency band beams of the first UE relative to the electronic device; and
   enabling the electronic device to communicate with the first UE according to the re-generated high-frequency band beams.

3. The electronic device of claim 1, wherein:
   each packet, transmitted from a UE to the electronic device, comprises a user-defined field storing a parameter, Active_BeamTracking; and
   when the Active_BeamTracking=1, the processor further implements a function of performing a beam tracking on the UE.

* * * * *